(12) United States Patent
Wang et al.

(10) Patent No.: US 9,857,189 B2
(45) Date of Patent: Jan. 2, 2018

(54) ENERGY-EFFICIENT NAVIGATION ROUTE FOR ELECTRIC TRANSPORTATION DEVICE

(71) Applicant: GM GLOBAL TECHNOLOGY OPERATIONS LLC, Detroit, MI (US)

(72) Inventors: Peggy Wang, Shanghai (CN); Michael O. Harpster, Jr., Oakland Township, MI (US); Wenjing Yang, Shanghai (CN); Eric Chen, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 45 days.

(21) Appl. No.: 15/018,262

(22) Filed: Feb. 8, 2016

(65) Prior Publication Data

US 2017/0227369 A1 Aug. 10, 2017

(51) Int. Cl.
*G01C 21/34* (2006.01)
*B60L 11/18* (2006.01)

(52) U.S. Cl.
CPC ...... *G01C 21/3469* (2013.01); *B60L 11/1861* (2013.01); *G01C 21/3492* (2013.01)

(58) Field of Classification Search
None
See application file for complete search history.

(56) References Cited

U.S. PATENT DOCUMENTS

| | | | | |
|---|---|---|---|---|
| 2010/0094496 A1* | 4/2010 | Hershkovitz | ............. | B60L 3/12 701/22 |
| 2013/0345945 A1* | 12/2013 | Fischer | ................... | F02D 45/00 701/102 |
| 2015/0046076 A1* | 2/2015 | Costello | ............. | G01C 21/3469 701/118 |
| 2015/0106289 A1* | 4/2015 | Basir | ...................... | G07C 5/008 705/325 |
| 2016/0061610 A1* | 3/2016 | Meyer | .................... | G01C 21/26 701/22 |
| 2016/0086397 A1* | 3/2016 | Phillips | ................ | G07C 5/0808 701/32.4 |

* cited by examiner

*Primary Examiner* — Mussa A Shaawat
*Assistant Examiner* — Abdhesh Jha
(74) *Attorney, Agent, or Firm* — Quinn IP Law

(57) ABSTRACT

A navigation system for an electric vehicle includes an electrical energy storing device having a currently-available energy and a controller. The electric vehicle is at least partially operated by a driver. An off-board control module is operatively connected to a remote server and configured to communicate with the controller. The controller has a processor and tangible, non-transitory memory on which is recorded instructions for executing a method of determining a preferred route for travelling from a start location to an end location. The controller is programmed to obtain respective energy consumption for each of a plurality of routes based at least partially on a driving style profile of the driver.

12 Claims, 3 Drawing Sheets

ENERGY-EFFICIENT NAVIGATION ROUTE FOR ELECTRIC TRANSPORTATION DEVICE

TECHNICAL FIELD

The disclosure relates generally to selection of navigation routes for electric transportation devices, and more particularly, to selection of an energy-efficient navigation route for an electric vehicle.

BACKGROUND

Electric transportation devices, such as electric vehicles, typically rely on a battery for power. After a specific amount of usage, the battery requires recharging. For extended travel, the battery may require recharging prior to arriving at the destination.

SUMMARY

A navigation system for an electric transportation device, such as an electric vehicle, includes an electrical energy storing device having a currently-available energy and a controller. The electric transportation device is at least partially operated by a driver. An off-board control module is operatively connected to a remote server and configured to communicate with the controller. The off-board control module is not physically connected to the controller. The controller has a processor and tangible, non-transitory memory on which is recorded instructions for executing a method of determining a preferred route for travelling from a start location to an end location. Execution of the instructions by the processor causes the controller to obtain a plurality of routes from the start location to the end location. The controller is programmed to obtain respective energy consumption for each of the plurality of routes, based at least partially on a driving style profile of the driver.

If the respective energy consumption of one of the plurality of routes is greater than the currently-available energy, the controller is programmed to determine, via the off-board control module, availability of at least one charging station on said one of the plurality of routes. The controller is programmed to select the preferred route from the plurality of routes based at least partially on the availability of the at least one charging station and a lowest value of the respective energy consumption.

The controller is programmed to control at least one parameter of the electric transportation device such that the electric transportation device adheres to the preferred route. A plurality of driving sensors are each operatively connected to the electric transportation device and configured to obtain respective driving data. The driving sensors are configured to communicate the respective driving data to the controller. The off-board control module is programmed to construct the driving style from the respective driving data. The driving sensors may include a brake sensor, an accelerator sensor, a lateral accelerometer, a roll sensor and a pitch sensor. The off-board control module is programmed to construct the driving style profile from the respective driving data.

A smart phone may be programmed to receive the respective driving data from the controller and transmit the respective driving data to the off-board control module. A data transfer device may be selectively connected to the controller and programmed to transfer the respective driving data from the controller to the smart phone. The controller may be configured to transfer the respective driving data to the off-board control module through a Wi-Fi connection.

Obtaining the respective energy consumption for each of the plurality of routes includes: dividing each of the plurality of routes into a respective plurality of nodes with respective paths (i) having respective path lengths ($d_i$); and obtaining an expected speed ($S_{e,i}$) for each of the respective paths (i). The expected driving speed ($S_{e,i}$) on the $i^{th}$ path is based on an expected driving speed ($S_{e,NT}$) on the $i^{th}$ path without a traffic factor, an expected driving speed ($S_{e,T}$) on the $i^{th}$ path with the traffic factor and a sensitivity factor ($\beta$). The expected driving speed ($S_{e,i}$) on the $i^{th}$ path may be defined as: $S_{e,i}=S_{e,NT}+F=[S_{e,NT}+\beta*(S_{e,T}-S_{e,NT})]$. The sensitivity factor is defined as a ratio of a covariance and a variance such that: $\beta$=covariance [$S_{e,i}$, $S_{e,NT}$]/variance [$S_{e,NT}$].

The expected speed ($S_{e,i}$) may be converted to an energy consumption rate ($CR_i$) via a look-up table. The controller is programmed to obtain a respective path-energy consumed ($E_i$) along the respective paths (i) as a product of the energy consumption rate ($CR_i$) and the respective path lengths ($d_i$) such that $E_i=(CR_i*d_i)$. The controller is programmed to obtain the respective energy consumption along each of the plurality of routes as a sum of the respective path-energy consumed ($E_i$) along all the respective paths (i).

The above features and advantages and other features and advantages of the present invention are readily apparent from the following detailed description of the best modes for carrying out the invention when taken in connection with the accompanying drawings.

DETAILED DESCRIPTION

Figure 1:
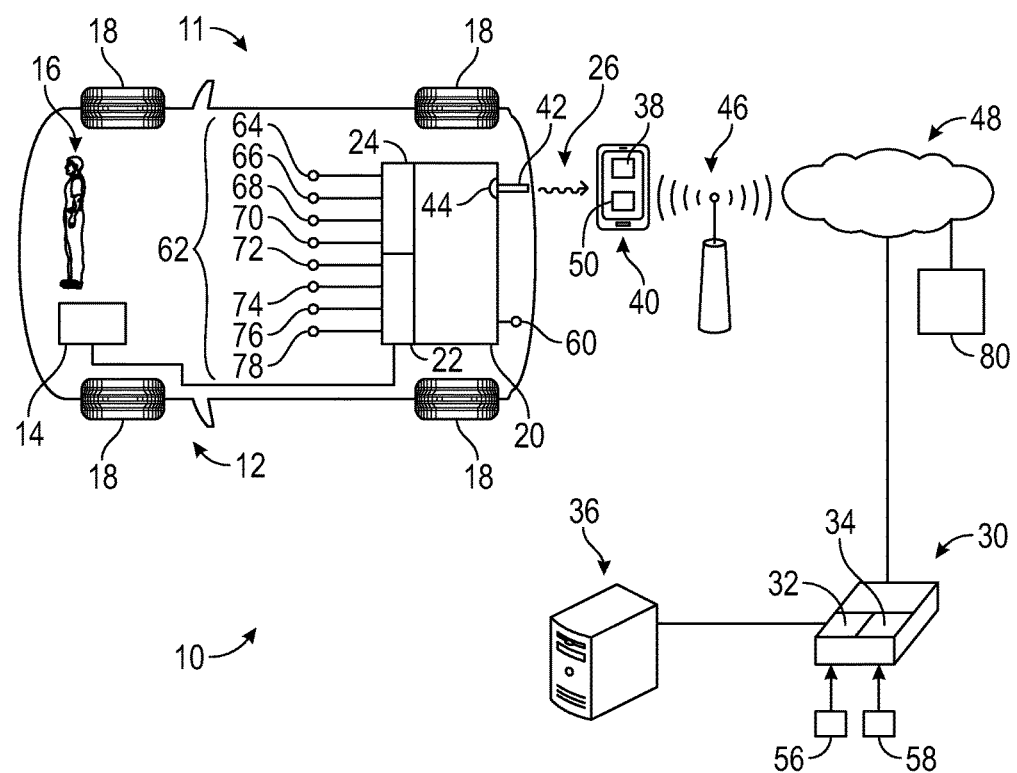
FIG. 1 is a schematic view of a navigation system for an electric transportation device, in accordance with a first embodiment.

Referring to the drawings, wherein like reference numbers refer to like components, FIG. 1 schematically illustrates a first navigation system 10 for an electric transportation device 11, in accordance with a first embodiment. In the embodiments shown, the electric transportation device 11 is an electric vehicle 12, however, it is to be understood that the electric transportation device 11 may be a bicycle, a robot, farm implement, sports-related equipment or any other electrically-powered transportation device. The electric vehicle 12 may be a passenger vehicle, performance vehicle, military vehicle or an industrial vehicle, or any type of vehicle.

The electric vehicle 12 includes an electrical energy storing device, such as a battery 14, having a currently-available energy, and is at least partially operated by a driver 16. The vehicle 12 may include wheels 18. Referring to FIG.

Figure 3:
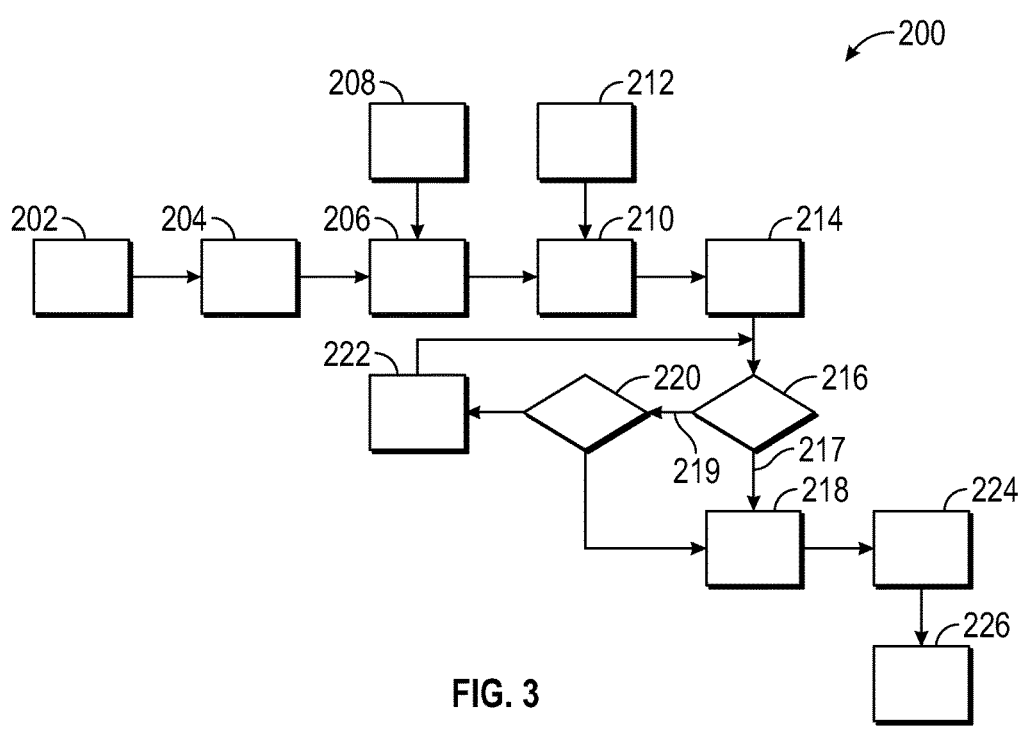
FIG. 3 is a flowchart for a method for determining a preferred route, from a plurality of routes, for travelling from a start location to an end location for the device of FIGS. 1 and 2.

1, electric vehicle 12 includes a controller 20 having at least one processor 22 and at least one memory 24 (or any non-transitory, tangible computer readable storage medium) on which are recorded instructions for executing method 200, shown in FIG. 3, for determining a preferred route 302 for travelling from a start location 304 to an end location 306. The memory 24 can store controller-executable instruction sets, and the processor 22 can execute the controller-executable instruction sets stored in the memory 24.

Referring to FIG. 1, an off-board control module 30 is operatively connected to a remote server 36 and configured to communicate with the controller 20. The off-board control module 30 is not physically connected to the controller 20 and has at least one processor 32 and at least one memory 34 (or any non-transitory, tangible computer readable storage medium). The memory 34 can store controller-executable instruction sets, and the processor 32 can execute the controller-executable instruction sets stored in the memory 34. The remote server 36 may include a central processing unit and data storage unit.

In the embodiment of FIG. 1, the controller 20 may communicate with the off-board control module 30, via a first mobile application 38, running on a cellular wireless device 40, such as a smart phone 40. The circuitry and components of a remote server, cellular wireless device, mobile applications ("apps") are known to those skilled in the art. Referring to FIG. 1, a data transfer device 42 may be employed to connect to a port 44 on the controller 20 and read the vehicle data such as the speed, the location, the status of the battery 14, and information from various sensors. The data transfer device 42 may be selectively connected (i.e. may be connected and then disconnected) to the controller 20 and specifically programmed to transfer the respective driving data from the controller 20 to the smart phone 40. The information from various sensors may be transmitted on the vehicle bus. The vehicle data may be read from the vehicle bus by the data transfer device 42. The data transfer device 42 may be any hardware or general-purpose computer specifically programmed to retrieve data from the controller 20, when plugged into the port 44.

Referring to FIG. 1, the data transfer device 42 may transmit data to the smart phone 40 via a wireless connection 26. The data transfer device 40 may have Bluetooth™ connectivity and the wireless connection 26 may be a Bluetooth™ connection. Bluetooth™ is defined as being a short-range radio technology (or wireless technology) aimed at simplifying communications among Internet devices and between devices and the Internet. Bluetooth™ is an open wireless technology standard for transmitting fixed and mobile electronic device data over short distances and creates personal networks operating within the 2.4 GHz band. Any other type of connection may be employed.

Referring to FIG. 1, the smart phone 40 may transmit the data to the off-board control module 30 via an access point 46 and wireless network 48. The access point 46 is employed to broadcast a wireless signal that various devices can detect and "tune" into. The wireless network 48 may be a Wireless Local Area Network (LAN) which links multiple devices using a wireless distribution method. The wireless network 48 may be a Wireless Metropolitan Area Networks (MAN) which connects several wireless LANs. The wireless network 48 may be a Wireless Wide Area Network (WAN) which covers large areas such as neighboring towns and cities.

Referring to FIG. 1, in order to connect to the access point 46 and the wireless network 48, the smart phone 40 may be equipped with a network adapter 50. The network adapter 50 interfaces with the wireless network 48 and is typically built on a printed circuit board with jumpers. The network adapter 50 may connect with the network through a built-in or externally connected antenna and may support LAN protocols such as TCP/IP.

The controller 20 (of FIGS. 1-2) is configured, i.e., specifically programmed to execute the steps of the method 200 (as discussed in detail below with respect to FIG. 3) and may receive inputs from various sensors. Referring to FIG. 1, a temperature sensor 60 is operatively connected to the controller 20 and configured to obtain the ambient temperature. Referring to FIG. 1, a plurality of driving sensors 62 may be in communication (e.g., electronic communication) with the controller 20 and configured to obtain respective driving data. The driving sensors 62 are configured to communicate the respective driving data to the controller. The driving sensors may include a vehicle speed sensor 64, brake pedal force sensor 66, accelerator pedal force sensor 68, lateral accelerometer 70, longitudinal accelerometer 72. The driving sensors may include a steering wheel angle sensor 74, roll sensor 76 and a pitch sensor 78. The respective driving data may describe driver traits including, but not limited to: degree and frequency of acceleration and braking, steering control, vehicle speed relative to a speed limit, frequency of passing and frequency of changing lanes.

Figure 2:
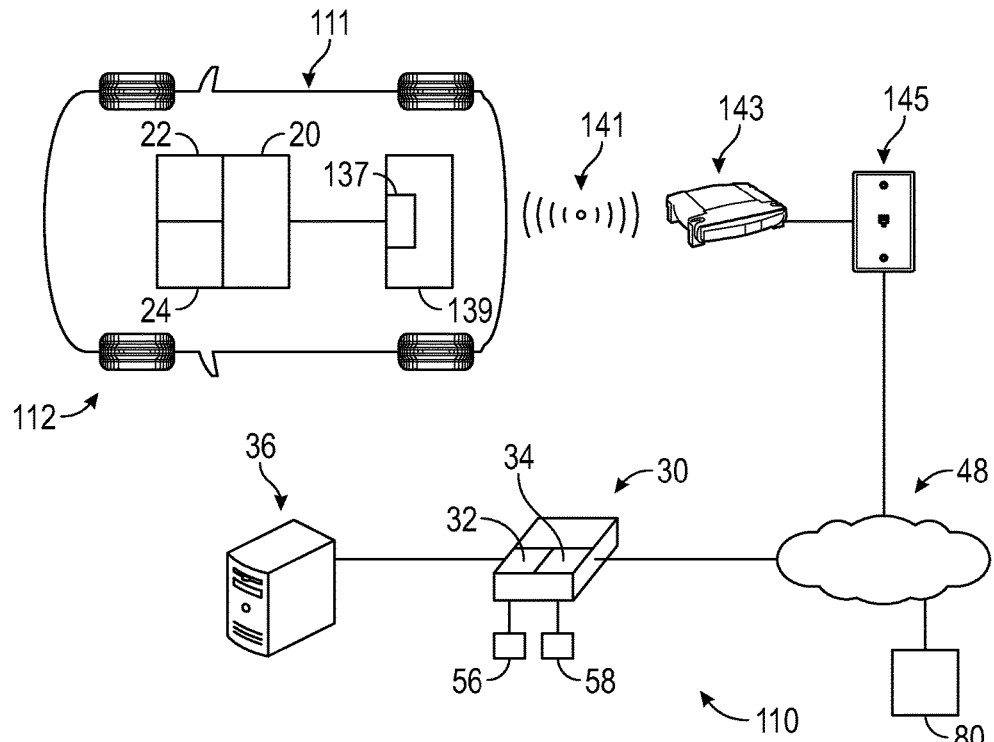
FIG. 2 is a schematic view of another navigation system for the electric transportation device, in accordance with a second embodiment.

Referring to FIG. 2, a second navigation system 110 for an electric transportation device 111, in accordance with a second embodiment is shown. The electric transportation device 111 may be an electric vehicle 112, such as a passenger vehicle, performance vehicle, military vehicle or an industrial vehicle, or a bicycle, a robot, farm implement, sports-related equipment or any other electrically-powered transportation device. The second navigation system 110 is similar in all respects to the first navigation system 10, except for the features described below. For simplicity, the driving sensors 62 are not shown in FIG. 2, however, it is understood that they are included in the electric vehicle 112.

In the embodiment of FIG. 2, the controller 20 may communicate with the off-board control module 30, via a second mobile application 137 that may be built into and run on a vehicle infotainment system 139. The second mobile application 137 may be integral with or physically connected (e.g. wired) to the controller 20, such that it has physical access to the data in the controller 20. The controller 20 may transmit information, including but not limited to the driving data, to the off-board control module 30 via a Wi-Fi connection 141.

Referring to FIG. 2, the Wi-Fi connection 141 may be defined as any wireless local area network product that is based on the Institute of Electrical and Electronics Engineers (IEEE) 802.11 standards. The Wi-Fi connection 141 works with no physical wired connection between sender and receiver by using radio frequency (RF) technology, a frequency within the electromagnetic spectrum associated with radio wave propagation. When an RF current is supplied to an antenna, an electromagnetic field is created that then is able to propagate through space. A routing device 143 may be employed to connect the controller 20 to a wired broadband connection 145 and wireless network 48. The routing device 143 may be a modem or other device known to those skilled in the art.

Referring now to FIG. 3, a flowchart of the method 200 stored on and executable by the controller 20 of FIGS. 1-2 is shown. Method 200 is applicable to both the first and second navigation systems 10 and 110. Method 200 need not be applied in the specific order recited herein. Furthermore, it is to be understood that some steps may be eliminated.

Figure 4:
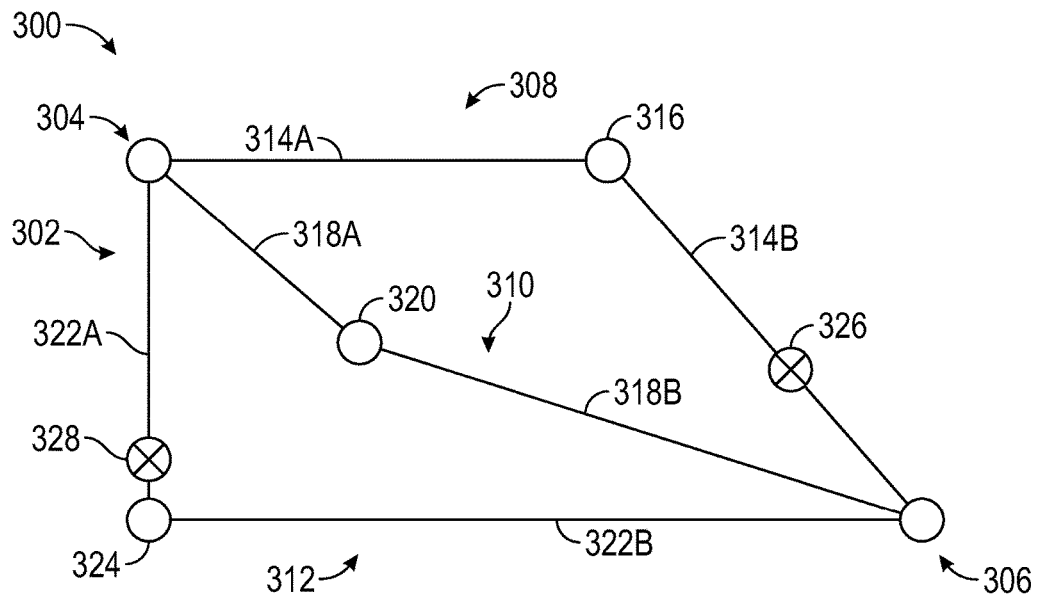
FIG. 4 is one example of the plurality of routes of FIG. 3.

Referring to FIG. 3, method 200 may begin with block 202, where the controller 20 is programmed or configured to obtain a plurality of routes from a start location to an end location. Referring to FIG. 4, a plurality of routes 300 from the start location 304 to the end location 306 are shown. The start location 304 and the end location 306 may be communicated by the driver 16 to the controller 20 via a driver interface (not shown). Referring to FIG. 4, the plurality of routes 300 may include first, second and third routes 308, 310, 312.

In block 204 of FIG. 3, the controller 20 is programmed to divide each of the plurality of routes 300 into a respective plurality of nodes with respective paths (i) having respective path lengths ($d_i$). Referring to the example shown in FIG. 4, the first route 308 may be split into sub-paths 314A and 314B, separated by a first node 316. The second route 310 may be split into sub-paths 318A and 318B, separated by a second node 320. The third route 312 may be split into sub-paths 322A and 322B separated by a third node 324. Dijkstra's algorithm, A* (A Star) or any other method known to those skilled in the art may be employed.

In block 206 of FIG. 3, the controller 20 is programmed to obtain an expected speed ($S_{e,i}$) for each of the respective paths (i). The expected driving speed ($S_{e,i}$) on the $i^{th}$ path is based on an expected driving speed ($S_{e,NT}$) on the $i^{th}$ path without a traffic factor, an expected driving speed ($S_{e,T}$) on the $i^{th}$ path with a traffic factor and a sensitivity factor ($\beta$). The expected driving speed ($S_{e,i}$) on the $i^{th}$ path may be defined as:

$$S_{e,i}=S_{e,NT}+F=[S_{e,NT}+\beta*(S_{e,T}-S_{e,NT})].$$

The expected driving speed ($S_{e,NT}$) on the $i^{th}$ path without a traffic factor (e.g., in a midnight time session) and the expected driving speed ($S_{e,T}$) on the $i^{th}$ path with a traffic factor are estimated from historical driving speed data at a certain time period of a day, based on input from block 208. In block 208 of FIG. 3, the controller 20 is programmed to obtain historical speed along the plurality of routes from the off-board control module 30. Referring to FIGS. 1-2, the off-board control module 30 may be in electronic communication with and employ data from multiple electric transportation devices, such as a second electric vehicle 56 and a third electric vehicle 58, to obtain the historical driving speed data at a certain time period of a day.

The sensitivity factor ($\beta$) is defined as a ratio of a covariance and a variance such that: $\beta$=covariance [$S_{e,i}$, $S_{e,NT}$]/variance [$S_{e,NT}$]. Covariance is a measure of how changes in one variable are associated with changes in a second variable. Specifically, covariance measures the degree to which two variables are linearly associated. If an increase in one variable corresponds with an increase in the other variable, the covariance is positive. Where an increase in one variable corresponds with a decrease in the other variable, the covariance is negative. The covariance between two jointly distributed real-valued random variables X and Y, where E[X] is the expected value or mean of X and assuming finite second moments, is defined as:

$$\sigma(X,Y)=E[(X-E[X])(Y-E[Y])]=E[(X-E[X])(Y-E[Y])].$$

Variance (V) is a special case of the covariance when the two variables are identical and is defined as: $\sigma(X,X)=\sigma^2(X)$. Variance measures the degree of spread of a set of numbers. A variance of zero indicates that all the values are identical. Variance is always non-negative; a small variance indicates that the data points are close to the mean or expected value and each other, while a high variance indicates that the data points are well spread out around the mean and from each other. The square root of the variance is the standard deviation.

The historical driving speed data in the off-board control module 30 may be modified by real-time traffic flow data. Referring to FIG. 1, the off-board control module 30 may obtain real-time traffic data from a traffic data source 80, via the wireless network 48. The traffic data source 80 may be a navigation database or any commercially available source of real-time traffic data known to those skilled in the art.

Figure 5:
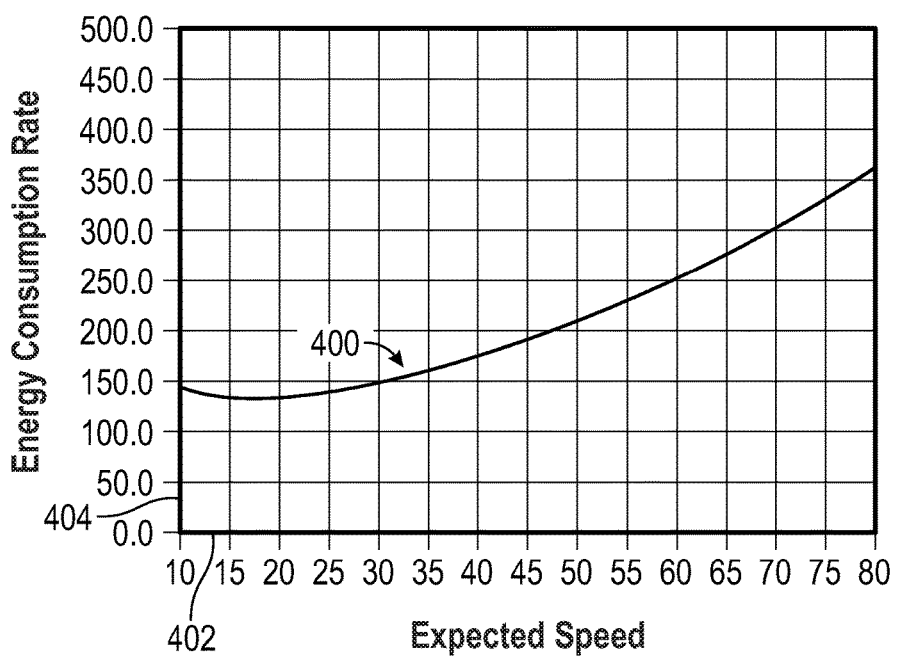
FIG. 5 is one example of a graph that may be employed in the method of FIG. 3, showing energy consumption rate (Watt-hour per mile) in the vertical axis and vehicle speed (miles per hour) in the horizontal axis.

In block 210 of FIG. 3, the controller 20 is programmed to convert the expected speed ($S_{e,i}$) to an energy consumption rate ($CR_i$), via a look-up table or graph. FIG. 5 is one example of a look-up graph 400 that may be employed for converting the expected speed ($S_{e,i}$) to an energy consumption rate ($CR_i$). FIG. 5 shows the vehicle expected speed (miles per hour) in the horizontal axis 402 and energy consumption rate (Watt-hour per mile) in the vertical axis 404. The graph is different for each individual driver. An energy-speed relation for a particular vehicle or device model may be used as the baseline for the driver 16 and modified by the respective driving data obtained by the off-board control module 30. In block 212 of FIG. 3, the controller 20 is programmed to obtain a driving style profile from the off-board control module 30. The off-board control module 30 is programmed (with the memory 34 and processor 32) to construct a driving style profile based on the respective driving data from the driving sensors 62. The off-board control module 30 may store particular types of driving style models and may match the respective driving data with statistical models of driving style known to those skilled in the art. The off-board control module 30 (through processor 32 and memory 34) may be specifically programmed to build and identify statistical models of driving style based on driving data from drivers in multiple electric transportation devices, such as a second electric vehicle 56 and a third electric vehicle 58.

In block 214 of FIG. 3, the controller 20 is programmed to obtain the respective energy consumption along each of the plurality of routes (such as the plurality of routes 300 in FIG. 4). First, the controller 20 is programmed to obtain a respective path-energy consumed ($E_i$) along each path (i) as a product of the energy consumption rate ($CR_i$) and the respective path lengths ($d_i$) such that $E_i=(CR_i*d_i)$. Second, the controller 20 is programmed to obtain the respective energy consumption along each of the plurality of routes as a sum of the respective path-energy consumed ($E_i$) along all the respective paths (i).

In block 216 of FIG. 3, the controller 20 is programmed to compare the respective energy consumption of each of the plurality of routes (such as the plurality of routes 300 in FIG. 4) relative to the currently-available energy of the battery 14. The energy stored in the battery 14 may be measured in watt-hours (Wh), kilowatt-hours (kWh), or ampere-hours (Ahr). The "battery capacity" represents the maximum amount of energy that can be extracted from the battery 14 under certain specified conditions. The available energy or the actual energy of the battery 14 is based on the battery capacity, the age and past history of the battery, the charging or discharging regimes of the battery 14 and the ambient temperature (detected by temperature sensor 60 of FIG. 1). At higher temperatures, the battery capacity is typically higher than at lower temperatures. The controller 20 may be programmed to modify the currently-available energy based on the temperature reading (T) of the temperature sensor 60. In one example, the currently-available energy is modified by a factor $(T-T_0)*C$, where $T_0$ is a threshold temperature and C is a constant. In one example, $T_0$ is 40° Celsius and C is 1.05.

If the respective energy consumption of one of the plurality of routes is less than the currently-available energy, the method 200 proceeds to block 218 from block 216, as indicated by line 217, where the controller 20 is programmed to mark or store the route as a "possible route."

If the respective energy consumption is greater than the currently-available energy, the method 200 proceeds to block 220 from block 216, as indicated by line 219, where the controller 20 is programmed to determine, via the off-board control module 30, the availability of at least one charging station on those routes. Referring to FIG. 4, for purposes of illustration, the first, second and third routes 308, 310, 312 are each assumed to have respective energy consumption greater than the currently-available energy.

In block 220, the controller 20 is programmed to determine, via the off-board control module 30, the availability of at least one charging station on each route. If no charging station is available on that particular route, the method 200 proceeds to block 222, where the controller 20 is programmed to mark or store the route as a "not advisable." Referring to FIG. 4, the second route 310 has no charging station, thus it is marked or stored as "not advisable."

If there is at least one charging station on the route, the method 200 proceeds to block 218 from block 220, where the controller 20 is programmed to mark the route as a "possible route." Referring to FIG. 4, the first route 308 includes a first charging station 326, and the third route 312 has a second charging station 328; thus both the first and third routes 308, 312 are stored or marked as "possible routes."

In block 224 of FIG. 2, from the routes marked or stored as "possible routes" in block 218, the controller 20 is programmed to select the route with the lowest value of the respective energy consumption (previously determined in block 214) as the "preferred route." Comparing the first route 308 and third route 312, the route with the lowest value of energy consumption is selected as the preferred route. In block 226, the controller 20 is programmed to control at least one operating parameter of the electric vehicle 12 such that the electric vehicle 12 adheres to the preferred route. If the electric vehicle 12 is following a route that is marked as "not advisable," the controller 20 may be programmed to shift to an alternative energy-saving operating mode. For example, the energy-saving operating mode may prevent high acceleration of the electric vehicle 12. The controller 20 may be programmed to display a visual message in an instrument panel (not shown) or other part, a voice alert or an audible chime. Thus the method 200 optimizes the operation and functioning of the electric transportation device 11.

The controller 20, the off-board control module 30 and the remote server 36 of FIGS. 1-2 may include: a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A navigation system for an electric transportation device, the electric transportation device being at least partially operated by a driver, the system comprising:
   an electrical energy storing device having a currently-available energy;
   a controller having a processor and tangible, non-transitory memory on which is recorded instructions for executing a method of determining a preferred route for travelling from a start location to an end location;
   an off-board control module operatively connected to a remote server and configured to communicate with the controller, the off-board control module not being physically connected to the controller;
   wherein execution of the instructions by the processor causes the controller to:
      obtain a plurality of routes from the start location to the end location;
      obtain a respective energy consumption for each of the plurality of routes based at least partially on a driving style profile of the driver; and
      control at least one operating parameter of the electric transportation device such that the electric transportation device adheres to the preferred route, including displaying a visual message, via the controller;
wherein said obtaining the respective energy consumption for each of the plurality of routes includes:
dividing each of the plurality of routes into a respective plurality of nodes with respective paths (i) having respective path lengths ($d_i$);
obtaining an expected speed ($S_{e,i}$) for each of the respective paths (i);
converting the expected speed ($S_{e,i}$) to an energy consumption rate ($CR_i$) via a look-up table;
obtaining respective path-energy consumed ($E_i$) along the respective paths (i) as a product of the energy consumption rate ($CR_i$) and the respective path lengths ($d_i$) such that $E_i=(CR_i*d_i)$;
obtaining the energy consumption along each of the plurality of routes as a sum of the respective path-energy consumed ($E_i$) along all of the respective paths (i);
wherein the expected driving speed ($S_{e,i}$) on an $i^{th}$ path is based on an expected driving speed ($S_{e,NT}$) on the $i^{th}$ path without a traffic factor, an expected driving speed ($S_{e,T}$) on the $i^{th}$ path with a traffic factor and a sensitivity factor ($\beta$); and
wherein the sensitivity factor is defined as a ratio of a covariance and a variance such that: ($\beta$=covariance ($S_{e,i}$, $S_{e,NT}$)/variance ($S_{e,NT}$)).

2. The system of claim 1, wherein the controller is programmed to:
if the respective energy consumption of one of the plurality of routes is greater than the currently-available energy, determine, via the off-board control module, availability of at least one charging station on said one of the plurality of routes; and
select the preferred route from the plurality of routes based at least partially on the availability of the at least one charging station and a lowest value of the respective energy consumption.

3. The system of claim 2, further comprising:
a plurality of driving sensors each operatively connected to the electric transportation device and configured to obtain respective driving data, the plurality of driving sensors each configured to communicate the respective driving data to the controller.

4. The system of claim 3, further comprising:
a smart phone programmed to receive the respective driving data from the controller and transmit the respective driving data to the off-board control module;
a data transfer device connectable to the controller and programmed to selectively transfer the respective driving data from the controller to the smart phone;
wherein the off-board control module is programmed to construct the driving style profile from the respective driving data.

5. The system of claim 3, wherein:
the controller is configured to transfer the respective driving data to the off-board control module through a Wi-Fi connection; and
the off-board control module is programmed to construct the driving style profile from the respective driving data.

6. The system of claim 3, wherein the plurality of driving sensors include a brake sensor, an accelerator sensor, a lateral accelerometer, a roll sensor and a pitch sensor.

7. The system of claim 1, wherein:
the expected driving speed ($S_{e,i}$) on the $i^{th}$ path is defined as:

$$S_{e,i}=[S_{e,NT}+\beta*(S_{e,T}-S_{e,NT})].$$

8. A method of navigation for an electric transportation device for travelling from a start location to an end location, the electric transportation device having an electrical energy storing device having a currently-available energy and a controller in communication with an off-board control module, the off-board control module not being physically connected to the controller, the electric transportation device being at least partially operated by a driver, the method comprising:
obtaining, via the controller, a plurality of routes from the start location to the end location;
obtaining a respective energy consumption of the electric transportation device for each of the plurality of routes, via the controller and the off-board control module;
if the respective energy consumption of one of the plurality of routes is greater than the currently-available energy, determining, via the off-board control module, availability of at least one charging station on said one of the plurality of routes;
selecting a preferred route from the plurality of routes, via the controller, based at least partially on the availability of the at least one charging station and a lowest value of the respective energy consumption;
controlling at least one operating parameter of the electric transportation device, via the controller, such that the electric transportation device adheres to the preferred route, including displaying a visual message;
wherein said obtaining the respective energy consumption of the electric transportation device for each of the plurality of routes includes:
dividing, via the controller, each of the plurality of routes into a respective plurality of nodes with respective paths (i) having respective path lengths ($d_i$);
obtaining an expected speed ($S_{e,i}$), via the controller, for each of the respective paths (i);
converting the expected speed ($S_{e,i}$), via the controller, to an energy consumption rate ($CR_i$) via a look-up table;
obtaining respective path-energy consumed ($E_i$), via the controller, along the respective paths (i) as a product of the energy consumption rate ($CR_i$) and the respective path lengths ($d_i$) such that $E_i=(CR_i*d_i)$;
obtaining the energy consumption along each of the plurality of routes, via the controller, as a sum of the respective path-energy consumed ($E_i$) along all of the respective paths (i);
wherein the expected driving speed ($S_{e,i}$) on an $i^{th}$ path is based on an expected driving speed ($S_{e,NT}$) on the $i^{th}$ path without a traffic factor, an expected driving speed ($S_{e,T}$) on the $i^{th}$ path with the traffic factor and a sensitivity factor ($\beta$); and
wherein the sensitivity factor is defined as a ratio of a covariance and a variance such that: ($\beta$=covariance ($S_{e,i}$, $S_{e,NT}$)/variance ($S_{e,NT}$)).

9. The method of claim 8, wherein:
the expected driving speed ($S_{e,i}$) on the $i^{th}$ path is defined as:

$$S_{e,i}=[S_{e,NT}+\beta*(S_{e,T}-S_{e,NT})].$$

10. A navigation system for an electric vehicle, the electric vehicle being at least partially operated by a driver, the system comprising:
- an electrical energy storing device having a currently-available energy;
- a controller operatively connected to the electric vehicle;
- an off-board control module operatively connected to a remote server and configured to communicate with the controller, the off-board control module not being physically connected to the controller;
- wherein the controller has a processor and tangible, non-transitory memory on which is recorded instructions for executing a method of determining a preferred route for travelling from a start location to an end location, wherein execution of the instructions by the processor causes the controller to:
  - obtain a plurality of routes from the start location to the end location;
  - obtain a respective energy consumption for each of the plurality of routes based at least partially on a driving style profile of the driver;
  - if the respective energy consumption of one of the plurality of routes is greater than the currently-available energy, determine, via the off-board control module, availability of at least one charging station on said one of the plurality of routes; and
  - select the preferred route from the plurality of routes based at least partially on the availability of the at least one charging station and a lowest value of the respective energy consumption;
  - control at least one parameter of the electric vehicle such that the electric vehicle adheres to the preferred route, including displaying a visual message;
- wherein said obtaining the respective energy consumption of the electric vehicle for each of the plurality of routes includes:
  - dividing each of the plurality of routes into a respective plurality of nodes with respective paths (i) having respective path lengths ($d_i$);
  - obtaining an expected speed ($S_{e,i}$) for each of the respective paths (i);
  - converting the expected speed ($S_{e,i}$) to an energy consumption rate ($CR_i$) via a look-up table;
  - obtaining respective path-energy consumed ($E_i$) along the respective paths (i) as a product of the energy consumption rate ($CR_i$) and the respective path lengths ($d_i$) such that $E_i=(CR_i*d_i)$; and
  - obtaining the energy consumption along each of the plurality of routes as a sum of the respective path-energy consumed (E) along all of the respective paths (i),
- wherein the expected driving speed ($S_{e,i}$) on an $i^{th}$ path is based on an expected driving speed ($S_{e,NT}$) on the $i^{th}$ path without a traffic factor, an expected driving speed ($S_{e,T}$) on the $i^{th}$ path with the traffic factor and a sensitivity factor ($\beta$),
- wherein the sensitivity factor is defined as a ratio of a covariance and a variance such that: ($\beta$=covariance ($S_{e,i}$, $S_{e,NT}$)/variance ($S_{e,NT}$)), and
- wherein the expected driving speed ($S_{e,i}$) on the $i^{th}$ path is defined as:

$$S_{e,i}=(S_{e,NT}+\beta*(S_{e,T}-S_{e,NT})).$$

11. The system of claim 10, further comprising:
- a smart phone programmed to receive the respective driving data from the controller and transmit the respective driving data to the off-board control module;
- a data transfer device connectable to the controller and programmed to selectively transfer the respective driving data from the controller to the smart phone;
- wherein the off-board control module is programmed to construct the driving style profile from the respective driving data.

12. The system of claim 11, wherein:
- the controller is configured to transfer the respective driving data to the off-board control module through a Wi-Fi connection; and
- the off-board control module is programmed to construct the driving style profile from the respective driving data.

* * * * *